Patented June 30, 1925.

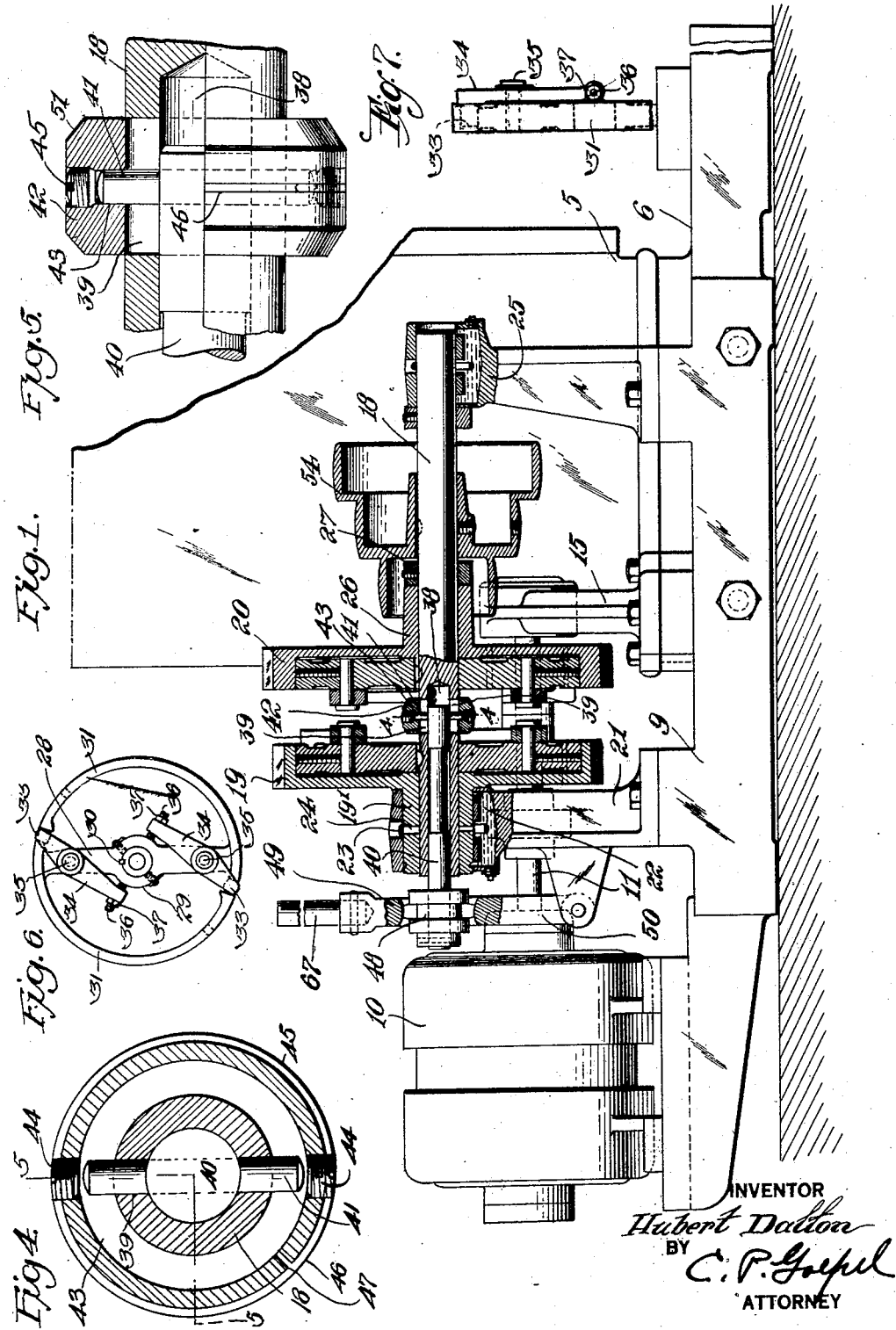

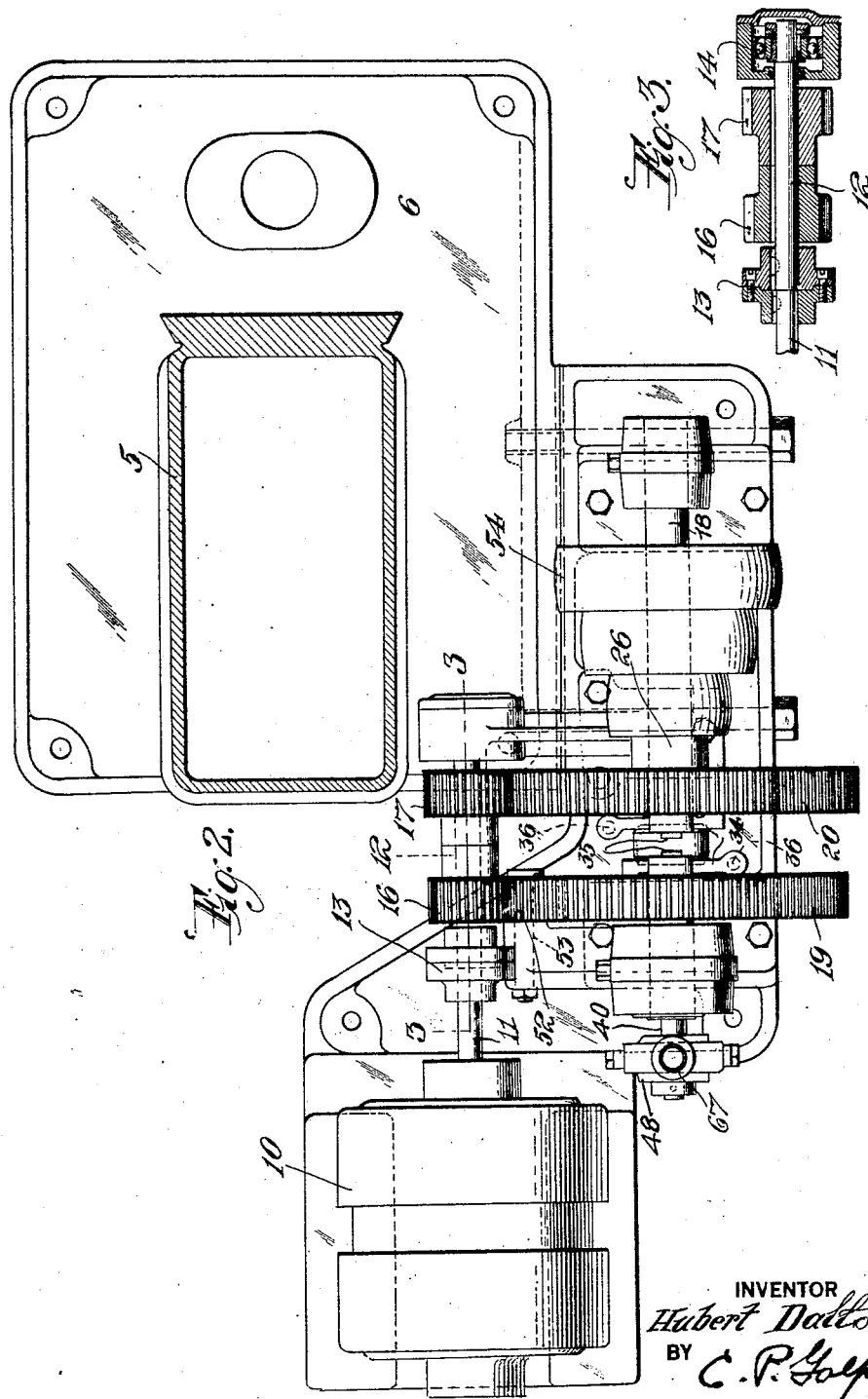

1,544,377

UNITED STATES PATENT OFFICE.

HUBERT DALTON, OF STAMFORD, CONNECTICUT.

CLUTCH MECHANISM FOR MOTOR-DRIVEN POWER-SUPPLY UNITS.

Application filed January 16, 1922. Serial No. 529,406.

*To all whom it may concern:*

Be it known that I, HUBERT DALTON, a citizen of the United States, and a resident of Stamford, county of Fairchild, State of Connecticut, have invented certain new and useful Improvements in a Clutch Mechanism for Motor-Driven Power-Supply Units, of which the following is a specification.

This invention relates to an improved clutch mechanism for motor driven power supply unit for lathes, drilling or milling machines and similar machines which are usually operated in series by power supplied from a common overhead counter-shaft.

More particularly, one feature of the present improvements resides in the provision of a very simple and effective clutch mechanism for transmitting power from the motor driven shaft to a counter-shaft and driving the latter in either direction.

With the above and other objects in view, the invention consists in the improved motor driven power supply unit and in the form, construction and relative arrangement of its several parts as will be hereinafter more fully described, illustrated in the accompanying drawings and subsequently incorporated in the subjoined claims.

In the drawings wherein I have illustrated one practical and satisfactory embodiment of the invention and in which similar reference characters designate corresponding parts throughout the several views:

Figure 1 illustrates a preferred form of my present improvements as applied for use in connection with a metal working machine, certain parts being shown in section;

Figure 2 is a top plan view, the machine column being shown in section;

Figure 3 is a detail section taken on the line 3—3 of Figure 2;

Figure 4 is an enlarged sectional view taken on the line 4—4 of Figure 1;

Figure 5 is a section taken on the line 5—5 of Figure 4;

Figure 6 is a side elevation of one of the gear clutches;

Figure 7 is a fragmentary edge elevation of the clutch.

In the accompanying drawings, for the purpose of showing the manner of application and use of the present invention, I have illustrated the same associated with a metal working machine. However, I have shown only so much of the latter as is necessary to a clear understanding of the present improvements. Accordingly, there may be seen in the drawings the hollow column 5 rising from the machine base 6 for supporting a head frame (not shown) in which head frame the main driving spindle for the machine is journaled.

As herein disclosed, a supporting base 9 is provided and suitably attached to the machine base 6. Upon the base 9 a non-reversible electric motor 10 of the required size is mounted. The shaft 11 of this motor is connected to one end of a power transmitting shaft 12 by means of a suitable coupling 13, the other end of said shaft 12 being mounted in a ball-bearing 14 provided in the upper end of the standard 15 fixed to the base 9. Spaced gears 16 and 17 respectively are keyed or otherwise securely fixed on the shaft 12.

Upon a counter-shaft 18, the relatively large gears 19 and 20 respectively, are loosely mounted in spaced relation to each other. The gear 19 is provided with a hub extension 19' on one side journaled in the upper end of a bearing standard 21, said hub extension loosely surrounding the counter-shaft 18. Any preferred means may be provided for lubricating the bearing extension or hub 19' but as herein shown I provide the upper end of the standard 21 with an oil chamber 22. A ring or annulus 23 of relatively large diameter is loosely hung on the hub extension 19' and extends into the body of lubricating oil. As the gear hub revolves in the bearing said ring is turned and thus applies oil to the periphery of said hub. The bearing hub is also provided with one or more openings 24 through which part of the oil finds its way to the interior surface of said hub.

The other end of the counter-shaft 18 is mounted in the upper end of a bearing standard 25 and is lubricated in the same manner as just described.

The other gear 20 is likewise provided with a hub extension 26 on one side which abuts against a stop collar 27 fixed to the counter-shaft 18.

The faces of the gears 19 and 20 which are in opposed relation to each other are chambered to receive clutch devices whereby the respective gears may be fixed to the counter-shaft to transmit a positive rotation to the latter. Each of these clutch devices comprises a double armed spider 28, the arms extending in diametrically opposite directions from a connecting hub 29 which is keyed upon the counter-shaft 18, as at 30. One end of a clutch band section 31 is integrally formed with the outer end of each arm of the spider, each of said sections being substantially semi-circular in form. Between the free end of each clutch band section 31 and the opposed end of the adjacent section an angular lug 33 on a pivoted lever 34 is disposed. This lever is loosely mounted intermediate of its ends upon a pin 35 fixed in the spider arm. At its other end each lever 34 carries an adjustable screw 36 which is fixed in its adjusted position by means of a lock nut 37.

The end of the counter-shaft 18 extending through the gear hub 19' is provided with a longitudinal bore 38 which terminates at a point adjacent to the other of the gears 20. Between the gears 19 and 20 the shaft 18 at diametrically opposite sides of the bore 38 is provided with longitudinally extending slots 39. A rod 40 is loosely engaged in the bore 38 for reciprocating movement and a transversely disposed pin 41 is fixed in the inner end of said rod. A double clutch cone 42 loosely surrounds the shaft 18 between the gears 19 and 20 and the ends of the pin 41 extending through the slots 39 are engaged in an annular channel or groove 43 provided in the inner face of said clutch cone. Threaded openings are provided in diametrically opposite sides of the cone 42 through which the pin 41 may be inserted and removed and these openings are normally closed by the threaded plugs 44, the inner ends of said plugs being substantially flush with the base wall of the groove or channel 43 and preventing movement of the pin into said openings in case the pin should become loosened. The plugs 44 are locked against a turning movement by means of a split contractile ring or band 45 which is adapted to be engaged in a circumferential groove 46 in the outer face of the cone 42. The outer ends of the plugs 44 are provided with kerfs or channels coinciding with this groove. One end of the ring or band 45 is angularly bent as at 47 in an inward direction and is adapted for engagement in an opening provided in the clutch cone 42, thus locking said ring against a casual circumferential shifting movement. It will thus be apparent that when the split ring or band 45 is applied and seated in the groove 46 and in the kerfs on the ends of the plugs 44, the latter will be held against turning or rotative movement.

The outer end of the rod 40 is provided with a grooved collar 48 with which a yoke 49 on the upper end of a pivoted lever 50 is operatively engaged. It will thus be apparent that when the lever 50 is shifted, the rod 40 is moved longitudinally in the bore of the counter-shaft 18 and the cone 42 shifted in one direction or the other on said shaft. This cone at opposite sides is provided with the circumferential cone faces 51 which are adapted to coact with the screws 36 on the inner ends of the levers 34 of the gear clutches to actuate said clutches and lock one or the other of the gears 19 or 20 to the counter-shaft as the case may be. When the cone 42 is shifted in one direction and engaged with the screws 36 of one of the clutches, the clutch levers are rocked upon the pivot pins 35 and their angular ends 33 exerting pressure against the free ends of the clutch band sections 31, expand said band sections against the annular clutch face of the gear.

The gear 20 is directly engaged with the gear 17 fixed on the power transmitting shaft 12. Between the gear 19 and the gear 16 a reversing gear 52 is interposed, said gear being journaled upon a stud shaft 53. Thus it will be apparent that when the gear 20 is locked to the counter-shaft said shaft is rotated in one direction, while when the other gear 19 is locked on said shaft, the rotation thereof is reversed.

Upon the counter-shaft 18 a stepped pulley 54 is keyed or otherwise rigidly fixed and is connected by means of the driving belt (not shown) to the stepped pulley on the main operating spindle of the machine (not shown).

While any preferred means may be employed for shifting the yoke lever 50, I preferably provide for this purpose a rod 67 connected to the upper end of said lever and coupled at its upper end with any suitable operating mechanism (not shown).

From the foregoing description, the manner of operation and several advantages of the present invention will be readily understood. Thus, in the event that the driving belt from the overhead counter-shaft should break or for any other reason it should become necessary to disconnect the operating spindle of the machine from the overhead power shaft, the operation of the machine may be continued by means of the individual power supply unit. Upon shifting the clutch cone 42 in one direction from the neutral position shown in Figure 1, the gear 20 is locked on the counter-shaft 18 so that rotation is transmitted from the motor shaft through the medium of gear 17 to the counter-shaft in one direction. Thus the machine spindle will be driven by a belt (not shown) engaging the driving pulley 54 on the counter-shaft. The other gear 19 is rotated idly in a reverse direction upon the counter-shaft 18. Upon shifting the clutch cone outwardly from its neutral position, the gear 19 is then clutched to the counter-shaft to reverse the rotation of said shaft and thus transmit a reverse rotation to the machine spindle while the gear 20 is rotated idly upon the counter-shaft. It will thus be seen that the gears remain constantly in mesh and there is no danger of stripping or breaking the gear teeth as might occur if it were necessary to shift the gears relative to each other.

In the accompanying drawings and the foregoing description, I have disclosed a particular embodiment of the invention which in actual practice has given highly satisfactory results. It will be understood that the motor driven power supply units may be employed as an auxiliary individual power supply means for use in connection with many different kinds of machines which are usually operated in series from a common counter-shaft deriving its power from either a steam, gas or electrically driven engine. Further, it will be apparent that the improved power supply unit is susceptible of many modifications and may be exemplified in various other alternative structures than the example illustrated herein. Accordingly, the privilege is reserved of resorting to all such legitimate changes in the form, proportion and arrangement of the several co-operating parts as may be fairly embodied within the spirit and scope of the invention as claimed.

I claim:

1. In power supply mechanism, a counter-shaft, spaced driving gears loosely mounted on said counter-shaft and driven in reverse directions from a common source of power, a clutch device associated with each of said gears, a double clutch cone mounted upon the counter-shaft between said gears, said counter-shaft having a longitudinal bore, a manually reciprocable rod mounted in said bore, and means operatively connecting said rod to the clutch cone whereby the latter may be shifted in either direction to actuate the respective clutch devices and thereby connect one of the driving gears to said counter-shaft to drive the latter in either direction.

2. In power supply mechanism, a counter-shaft, spaced driving gears loosely mounted upon said counter-shaft and driven in relatively opposite directions from a common source of power, a clutch device associated with each of said driving gears, a double clutch cone mounted upon the counter-shaft between said gears and provided with an internal annualr groove, said counter-shaft having a longitudinal bore, a manually reciprocable rod mounted in said bore, the counter-shaft having diametrically opposed slots communicating with the inner end of said bore, and a pin fixed in said rod projecting through the slots and into the annular groove in the clutch actuating cone whereby said cone may be shifted in either direction on the counter-shaft to actuate the respective clutch devices and connect one of the driving gears to the counter-shaft to drive the latter in either direction.

3. In combination, a shaft, a driving gear loosely mounted upon said shaft, an expansible clutch device associated with said gear, said shaft having a longitudinal bore and diametrically opposed slots communicating therewith, a clutch actuating member loosely engaged upon the shaft and having an internal annular groove, a manually operable rod reciprocable in said bore, a pin fixed in said rod, extending through said slots and engaged in the groove of said clutch actuating member, and means connected to the outer end of said rod whereby said member may be shifted upon the shaft to effectively engage the clutch device with said gear and thereby transmit a positive rotation to the shaft.

4. In combination, a shaft, a driving element loosely mounted upon said shaft, an expansible clutch device associated with said element including pivoted clutch expanding levers, an actuating member for said levers loosely mounted on the shaft, and manually operable axially reciprocable means mounted in the shaft and operatively connected to said member to effectively engage the same with the clutch expanding levers and thereby fix the driving element to said shaft to positively rotate the latter.

5. In combination with a shaft and a driving element therefor loosely mounted on the shaft, an expansible clutch device associated with said driving element including pivoted clutch expanding levers, an expanding cone for said levers loosely engaged upon said shaft and provided with an internal annular groove, actuating means for said cone mounted upon the shaft including a pin projecting at its ends into said internal groove whereby the cone may be shifted into and out of engagement with the clutch levers, said cone having diametrically opposed openings communicating with said internal groove, threaded plugs closing said openings, and means removably engaged upon the clutch cone and coacting with such plugs to lock the latter against rotation.

In testimony that I claim the foregoing as my invention, I have signed my name hereunder.

HUBERT DALTON.